US008496716B2

(12) United States Patent
Lange et al.

(10) Patent No.: US 8,496,716 B2
(45) Date of Patent: *Jul. 30, 2013

(54) METHOD FOR PRODUCING MANNICH ADDUCTS THAT CONTAIN POLYISOBUTYLENE PHENOL

(75) Inventors: Arno Lange, Bad Duerkheim (DE); Hans Peter Rath, Gruenstadt (DE); Dietmar Posselt, Heidelberg (DE); Irene Troetsch-Schaller, Bissersheim (DE); Marc Walter, Frankenthal (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,563

(22) Filed: Jun. 24, 2011

(65) Prior Publication Data
US 2011/0251114 A1 Oct. 13, 2011

Related U.S. Application Data

(63) Continuation of application No. 12/110,777, filed on Apr. 28, 2008, now Pat. No. 7,988,749, which is a continuation of application No. 10/089,064, filed on Apr. 5, 2002, now abandoned.

(30) Foreign Application Priority Data

Oct. 6, 1999 (DE) .................................. 199 48 111

(51) Int. Cl.
C10L 1/22 (2006.01)
(52) U.S. Cl.
USPC .............. 44/415; 508/542; 564/367; 564/368
(58) Field of Classification Search
USPC ....................... 44/415; 508/542; 564/367, 368
See application file for complete search history.

(56) References Cited

U.S. PATENT DOCUMENTS

| | | | |
|---|---|---|---|
| 3,413,347 A | 11/1968 | Worrel | |
| 3,787,458 A | 1/1974 | Piasek et al. | |
| 3,793,202 A | 2/1974 | Piasek et al. | |
| 4,117,011 A | 9/1978 | Malec | |
| 4,178,259 A | 12/1979 | King | |
| 4,231,759 A | 11/1980 | Udelhofen | |
| 4,334,085 A * | 6/1982 | Basalay et al. ................. | 564/367 |
| 4,668,412 A | 5/1987 | Hart | |
| 5,300,701 A * | 4/1994 | Cherpeck ...................... | 568/792 |
| 5,634,951 A | 6/1997 | Colucci | |
| 5,697,988 A | 12/1997 | Malfer et al. | |
| 5,725,612 A | 3/1998 | Malfer et al. | |
| 5,876,468 A | 3/1999 | Moreton | |
| 6,179,885 B1 | 1/2001 | McAtee | |
| 6,458,172 B1 | 10/2002 | Macduff et al. | |
| 6,562,913 B1 | 5/2003 | Baxter et al. | |
| 6,800,103 B2 | 10/2004 | Malfer et al. | |
| 2003/0056431 A1 | 3/2003 | Schwab et al. | |
| 2003/0079399 A1 | 5/2003 | Malfer et al. | |

FOREIGN PATENT DOCUMENTS

| | | |
|---|---|---|
| CA | 2089833 | 8/1993 |
| CA | 2375487 | 12/2000 |
| EP | 0 376 563 | 7/1990 |
| EP | 0 811 672 | 12/1997 |
| EP | 0811 672 | 12/1997 |
| EP | 831 141 | 3/1998 |
| FR | 2 424 956 | 11/1979 |
| GB | 1 368 532 | 9/1974 |
| WO | 90/03359 | 4/1990 |
| WO | 91/04959 | 4/1991 |
| WO | 93/19140 | 9/1993 |
| WO | 94/14739 | 7/1994 |
| WO | 94/14925 | 7/1994 |
| WO | 94/14926 | 7/1994 |
| WO | 94/14929 | 7/1994 |
| WO | 95/11955 | 5/1995 |
| WO | 95/15366 | 6/1995 |
| WO | 95/17485 | 6/1995 |
| WO | 95/29972 | 11/1995 |
| WO | 95/29973 | 11/1995 |
| WO | 95/29974 | 11/1995 |
| WO | 98/28346 | 7/1997 |
| WO | 97/43357 | 11/1997 |
| WO | 97/43358 | 11/1997 |
| WO | 97/43360 | 11/1997 |
| WO | 98/02468 | 1/1998 |
| WO | 98/05741 | 2/1998 |

(Continued)

OTHER PUBLICATIONS

Letter from third-party counsel dated Jun. 19, 2007.
Letter from third-party counsel dated Apr. 6, 2009.
J.M.G. Cowie, "Polymers Chemistry and Physics of Modern Materials", Second Edition, 1991, 5 pp.
F.W. Billmeyer, Jr., "Textbook of Polymer Science", Second Edition, 1971, 4 pp.
W.W. Yau, et al., "Modern Size-Exclusion liquid Chromatography", Practice of Gel Permeation and Gel Filtration Chromatography, 1979, 4 pp.

(Continued)

Primary Examiner — Cephia D Toomer
(74) Attorney, Agent, or Firm — Oblon, Spivak, McClelland, Maier & Neustadt, L.L.P.

(57) ABSTRACT

Polyisobutenylphenol-containing Mannich adducts are prepared by
a) alkylation of a phenol with highly reactive polyisobutene at below about 50° C. in the presence of an alkylation catalyst;
b) reaction of the reaction product from a) with formaldehyde, an oligomer or a polymer of formaldehyde and
at least one amine which has at least one secondary amino function and no primary amino function, or
c) reaction of the reaction product from a) with at least one adduct of at least one amine which has at least one secondary or primary amino function and formaldehyde, an oligomer of formaldehyde, a polymer of formaldehyde or a formaldehyde equivalent,
and are used as detergent additives in fuel and lubricant compositions, and additive concentrates, fuel compositions and lubricant compositions contain these Mannich adducts.

12 Claims, No Drawings

FOREIGN PATENT DOCUMENTS

| WO | 98/42808 | 10/1998 |
|---|---|---|
| WO | 00/78898 | 12/2000 |
| WO | 01/25294 | 4/2001 |
| WO | 01/42399 | 6/2001 |

OTHER PUBLICATIONS

"BP Chemicals Introduces Ultravis High-Performance Polybutene Polymer," BP Chemicals Press Release, Dec. 1990, 2 pp.

Assorted BP Chemicals Press Cuttings (4), 1 pg.

Technical Information, Gilssopal CE 5203.

Kirk-Othmer, Encyclopedia of Chemical Technology, Fourth Edition, vol. 8, 1993, pp. 944-955.

"Preperation of 299", Pilot Plant Report, Nov. 6. 1956.

BP Chemicals Press Cuttings.

Norman, Sir Richard, et al., Principals of Organic Synthesis, Third Edition, 1993, pp. 261-264.

March, Jerry, Advanced Organic Chemistry, Reactions, Mechanisms, and Structure, Fourth Edition, 1992, p. 900.

Declaration by John McMahon.

Ultravis 10 Technigram.

Feb. 8, 2000 Press Release: Program for First SAE International Fuels $ Lubricants Conference, Paris France (Jun. 19-22, 2000).

Program for First SAE International Fuels & Lubricants Conference, Paris, France (Jun. 19-22, 2000), pp. 17-36.

Aradi, et al. A Study of Fuel Additives for Direct Injection (DIG) Injector Deposit Control, First SAE International Fuels & Lubricants Conference, Paris, France (Jun. 19-22, 2000).

Aradi et all., The Effect of Fuel Composition, Engine Operating Parameters and Additive Content on Injector Deposits in a High-Pressure Drect Injection Gasoline (DIG) Research Engine, Aachen Colloquium for Automobile and Engine Technology, pp. 187-211 (Oct. 4-6, 2000).

Aug. 14, 2006, letter from third party counsel, bumitted in U.S. Appl. No. 10/536,451.

M. Rossenbeck: "Katalysatoren, tenside and mineraloeladditive" J. Falbe and U. Hasserodt, eds., G. Thieme Verlag, Stuttgart, pp. 223-229, 1978.

Patent Abstracts of Hungary, HU 165124, Jun. 28, 1974 (with corr. US 3,787,458 and US 3,793,202).

Patent Abstracts of Hungary , HU 164826, Apr. 11, 1974.

BP Chemicals Press Release.

* cited by examiner

METHOD FOR PRODUCING MANNICH ADDUCTS THAT CONTAIN POLYISOBUTYLENE PHENOL The present application is a continuation application of Ser. No. 12/110,777, filed Apr. 28, 1008, now U.S. Pat. No. 7,988,749, which is a continuation of Ser. No. 10/089,064, filed Apr. 5, 2002, now abandoned, and claims priority to DE 19948111.3 having a filing date of Oct. 6, 1999.

The present invention relates to a process for the preparation of polyisobutenylphenol-containing Mannich adducts, the Mannich adducts obtainable by this process and the use of the Mannich adducts as detergent additives in fuel and lubricant compositions.

Carburetors and intake systems of gasoline engines, but also injection systems for metering fuel, are increasingly contaminated with impurities which are caused by dust particles from the air, uncombusted hydrocarbon residues from the combustion chamber and the crank case vent gases passed into the carburetor.

These residues shift the air/fuel ratio during idling and in the lower part-load range so that the mixture becomes leaner and the combustion more incomplete and hence the proportions of uncombusted or partially combusted hydrocarbons in the exhaust gas become greater. Increasing gasoline consumption is the result.

It is known that, in order to avoid these disadvantages, fuel additives for keeping valves and carburetors or injection systems of gasoline engines clean are used (cf. for example M. Rossenbeck in Katalysatoren, Tenside, Mineralöladditive, editors J. Falbe and U. Hasserodt, page 223, G. Thieme Verlag, Stuttgart 1978).

Outstanding fuel additives of this type are aminoalkylated polyalkenyl hydroaromatics, as generally obtainable by a Mannich reaction of amines and aldehydes with polyalkyl-substituted hydroxyaromatics. These Mannich adducts are obtained as a rule in the form of complex mixtures of a plurality of amine-containing adducts having different cleaning activities and amine-free adducts generally having lower cleaning activities.

Such Mannich adducts generally have a good cleaning effect but possess a number of disadvantages.

Owing to the complex composition of the mixtures, a dark color and an intense odor, which adversely affect customer acceptance, are often observed. More serious, however, is the fact that, depending on composition, chain length of the polyalkylene moiety in the molecule, engine type and concentration in which the additive is used, such conventional Mannich adducts may cause sticking of the valves, which can lead to total engine failure. Sticking of the valves is understood as meaning complete loss of compression on one or more cylinders of the internal combustion engine if, owing to polymer deposits on the valve shaft, the spring forces are no longer sufficient to close the valves properly.

Thus, a number of publications, for example GB-A-1,368,532, U.S. Pat. No. 4,231,759, U.S. Pat. No. 5,634,951 and U.S. Pat. No. 5,725,612 describe fuel additives based on Mannich adducts, which are obtainable from polyolefin-substituted hydroxyaromatics. The Mannich adducts disclosed there are without exception those which are obtainable by alkylation of phenols with polyolefins having low reactivity and subsequent Mannich reaction. Such polyolefins having low reactivity are generally produced by polymerization of olefin mixtures and have a very nonuniform polymer backbone and a small proportion of terminal double bonds. The use of such polyolefins having low reactivity for the preparation of Mannich adducts leads to low yields in the alkylation step (less than 83%, cf. for example U.S. Pat. No. 5,634,951), nonuniform product distribution and a moderate cleaning effect when used as a fuel additive.

In contrast, EP-A-0 831 141 describes improved detergents for hydrocarbon fuels, which are obtainable from a highly reactive polyisobutene which has at least 70% olefinic double bonds of the vinylidene type, an aldehyde and ethylenediamine by a Mannich reaction with a polyisobutene-substituted phenol. The polyisobutenes used in the alkylation have an average molecular weight of 1000 and lead to polyisobutene-substituted phenols which have a ratio of para to ortho substitution of about 3:1. Thus, Example 1 of this reference describes a polyisobutenyl-phenol having an ortho/para ratio of 1:3 which is prepared from highly reactive polyisobutene and phenol in a molar ratio of 1:2 in the presence of $BF_3$ etherate. Here too, however, the Mannich adducts thus obtained are present as complex mixtures having a broad distribution and comparatively low proportion of nitrogen, as is evident from the overall parameters of nitrogen content and base number, stated instead of the analytical data.

The fuel and lubricant additives known from the prior art and based on Mannich adducts contain as a rule <50 mol % of nitrogen-containing compounds and have very broad molecular weight distributions. Consequently, these additives based on Mannich products were also incapable of eliminating the known problems, such as undesired color, unpleasant odor, and especially the problematic sticking of the valves. Moreover, a further increase in the efficiency of such fuel additives is desirable, on the other hand in order to keep pace with the increasing requirements arising from the progressive engine technology and, on the other hand, as far as possible to extend downward the concentration range for the additives in the fuel which is required for the desired effect.

It is an object of the present invention to provide a process for the preparation of Mannich products based on polyalkylenephenols and thereby obtainable Mannich adducts with polyalkylene phenols having improved properties.

We have surprisingly found that this object is achieved by a process in which specific polyisobutenyl-substituted phenols, which are obtained by alkylation of phenols with highly reactive polyisobutenes, are reacted either with formaldehyde or oligomers or polymers of formaldehyde in the presence of a secondary amine or with an adduct of at least one amine with formaldehyde, another formaldehyde source or a formaldehyde equivalent.

In particular, it is surprising that the Mannich adducts thus obtained exhibit substantially improved viscosity behavior, in particular at low temperatures, and an improved detergent effect without the common disadvantages of the prior art. The Mannich adducts thus obtained have a particularly high proportion of nitrogen-containing compounds and a comparatively narrow molecular weight distribution. Moreover, it was surprisingly found that, in contrast to the prior art, the cleaning effect of the Mannich adducts is only slightly dependent on the type and structure of the amine used. In addition, it was found that the Mannich adducts thus obtained can be particularly easily fractionated by column chromatography and hence made more uniform.

The present invention therefore relates to a process for the preparation of polyisobutenylphenol-containing Mannich adducts by a) alkylation of a phenol with highly reactive polyisobutene at below about 50° C. in the presence of an alkylation catalyst;

b) reaction of the reaction product from a) with
    formaldehyde, an oligomer or a polymer of formaldehyde and
    at least one amine which has at least one secondary amino function and no primary amino function
    or
c) reaction of the reaction product from a) with at least one adduct of at least one amine which has at least one secondary or primary amino function and formaldehyde, an oligomer of formaldehyde, a polymer of formaldehyde or a formaldehyde equivalent.

Suitable polyisobutenes are highly reactive polyisobutenes, which differ from the polyisobutenes having low reactivity through the content of terminally arranged ethylenic double bonds. Suitable highly reactive polyisobutenes are, for example, polyisobutenes which have more than 70, in particular more than 80, especially more than 85, mol %, based on the polyisobutene macromolecules, of vinylidene double bonds. Particularly preferred polyisobutenes are those which have uniform polymer backbones. In particular, those polymers which are composed of at least 85, preferably at least 90, particularly preferably at least 95, % by weight of isobutene units have uniform polymer backbones. Preferably, such highly reactive polyisobutenes have a number average molecular weight of from 200 to 20,000. Highly reactive polyisobutenes which have an average molecular weight of from 300 to 3000, particularly preferably from 400 to 2500, very particularly preferably from 500 to 1500, for example a number average molecular weight of about 550, about 800, about 1000 or about 2300, are particularly suitable for the preparation of fuel additives. Highly reactive polyisobutenes which have a number average molecular weight of from 2500 to 15,000, particularly preferably from 3000 to 12,500, very particularly preferably from 3000 to 10,000, for example a number average molecular weight of about 2300, about 5000 or about 8000, are particularly suitable for the preparation of lubricant additives. Preferably, the highly reactive polyisobutenes moreover have a polydispersity of less than 3.0, in particular less than 1.9, particularly preferably less than 1.7 or less than 1.5. Polydispersity is understood as meaning the quotient of weight average molecular weight $M_W$ and number average molecular weight $M_N$.

Particularly suitable highly reactive polyisobutenes are, for example, the Glissopal® brands from BASF AG, in particular Glissopal 1000 ($M_N$=1000), Glissopal V 33 ($M_N$=550) and Glissopal 2300 ($M_N$=2300) and mixtures thereof. Other number average molecular weights can be established in a manner known in principle by mixing polyisobutenes of different number average molecular weights or by extractive enrichment of polyisobutenes of specific molecular weight ranges. They are also obtainable by direct synthesis.

A phenol is reacted (alkylated) with such a highly reactive polyisobutene in a first step (step a)). Aromatic hydroxy compounds, such as unsubstituted phenol and monosubstituted or disubstituted phenols, are very generally suitable for the reaction with highly reactive polyisobutenes. The aromatic hydroxy compound used for the alkylation is preferably selected from phenolic compounds with 1, 2 or 3 OH groups and with or without at least one further substituent. Particularly suitable substituted phenols are mono-ortho-substituted phenols. Suitable substituents are, for example, $C_1$-$C_{20}$-alkyl, $C_1$-$C_{20}$-alkoxy or a further polyalkylene radical, in particular polyalkylene radicals based on highly reactive polyisobutenes. Particularly suitable substituents are $C_1$-$C_7$-alkyl, such as methyl, ethyl, n-propyl, isopropyl, n-butyl, sec-butyl, tert-butyl and hexyl. Particularly suitable alkyl-substituted phenols are 2-methylphenol and 2-ethylphenol. Unsubstituted phenol is particularly preferred for the alkylation with polyisobutenes.

In the alkylation, the phenol is usually used in excess. For example, about a 1.1- to 6-fold, preferably 1.6- to 5-fold, excess, such as a 2-fold or a 4-fold excess, of the phenol is suitable. The crude product obtained is further reacted under b) or c), if required after purification.

In one embodiment of the present process, the phenol is used in excess in the preparation of the polyisobutenylphenol and, after the end of the reaction, the reaction mixture is freed from excess phenol by extraction with solvents, preferably polar solvents, such as water or $C_1$-$C_6$-alkanols or mixtures thereof, by stripping, i.e. by passing steam through or, if required, heating of gases, e.g. nitrogen, or by distillation.

The alkylation of the phenol is carried out at below about 50° C., preferably below 35° C., in particular below 25° C., in the presence of an alkylation catalyst. As a rule the alkylation is carried out at above −40° C., preferably above −30° C., in particular above −20° C. Temperatures from −10 to +30° C., in particular from −5 to +25° C., particularly preferably from 0 to +20° C., are particularly suitable for the alkylation.

Suitable alkylation catalysts are known to a person skilled in the art. For example, protic acids, such as sulfuric acid, phosphoric acid and organic sulfonic acids, e.g. trifluoromethanesulfonic acid, Lewis acids, such as aluminum trihalides, e.g. aluminum trichloride or aluminum tribromide, boron trihalides, e.g. boron trifluoride and boron trichloride, tin halides, e.g. tin tetrachloride, titanium halides, e.g. titanium tetrabromide and titanium tetrachloride, and iron halides, e.g. iron trichloride and iron tribromide, are suitable. Adducts of boron trihalides, in particular boron trifluoride, with electron donors such as alcohols, in particular $C_1$-$C_6$-alkanols or phenols, or ethers are preferred. Boron trifluoride etherate is particularly preferred.

The alkylation is preferably carried out in a liquid medium. For this purpose, the phenol is preferably dissolved in one of the reactants and/or in a solvent, if necessary with heating. In a preferred embodiment, the alkylation is preferably carried out by first melting the phenol or the substituted phenol by supplying heat and then adding a suitable solvent and/or the alkylation catalyst, in particular the boron trihalide adduct. The liquid mixture is then brought to a suitable reaction temperature. In a further preferred embodiment the phenol is first melted and the polyisobutene and, if required, suitable solvent are added. The liquid mixture thus obtained can be brought to a suitable reaction temperature and the alkylation catalyst can then be added.

Suitable solvents for carrying out this reaction are, for example, hydrocarbons, preferably pentane, hexane and heptane, in particular hexane, hydrocarbon mixtures, e.g. petroleum naphthas having boiling ranges from 35 to 100° C., dialkyl ethers, in particular diethyl ether, and halogenated hydrocarbons, such as dichloromethane or trichloromethane, and mixtures of the abovementioned solvents.

The reaction is preferably initiated by adding the catalyst or one of the two reactants, phenol or polyisobutene. The addition of the component initiating the reaction is preferably effected over a period of from 5 to 300, preferably from 10 to 200, in particular from 15 to 180, minutes, the temperature of the reaction mixture advantageously not exceeding the above-mentioned temperature ranges. After the end of the addition, the reaction mixture is allowed to continue reacting for preferably from 30 minutes to 24 hours, in particular from 60 minutes to 16 hours, at below 30° C. The reaction conditions are preferably chosen so that at least 85%, in particular at least 90%, particularly preferably at least 95%, of the polyisobutenylphenol form. The polyisobutenyl-substituted phenols thus obtained preferably comprise (where the aromatic hydroxy compound used as the starting material allows) more than 85%, in particular more than 90%, and particularly preferably more than 95%, of isomers whose polyisobutenyl radical is para to the hydroxyl group of the phenol.

Preferably, the alkylation product used for the subsequent reaction in steps b) and c) includes little if any unconverted phenol.

When the aromatic hydroxy compound used for the alkylation in step a) allows multiple alkylations, the reaction is preferably carried out in such a way that the polyisobutenylphenols obtained include little if any product more than monoalkylated by the polyisobutene. In fact, the alkylation products used for the subsequent reaction in steps b) or c) include not more than 20 mol %, preferably not more than 10 mol %, especially not more than 5 mol %, based on the total amount of alkylation products, of more than monoalkylated phenols.

The reaction product obtained under a) can be converted into the novel, advantageous Mannich adduct in two different ways. On the one hand, the reaction product obtained under a) can be reacted under b) with formaldehyde, an oligomer and/or a polymer of formaldehyde (also referred to below as a formaldehyde source) and at least one amine which has at least one secondary and no primary amino function.

On the other hand, the reaction product obtained under a) can be reacted under c) with at least one adduct of at least one amine which has at least one secondary or primary amino function and formaldehyde, an oligomer or a polymer of formaldehyde (these are also referred to below as formaldehyde sources) or a formaldehyde equivalent. In the context of the invention, formaldehyde equivalents are methylene components which are capable of reacting with amines to give imines or aminals, such as dihalomethane, in particular dichloro- and dibromomethane, and dialkoxymethane, in particular dimethoxymethane and diethoxymethane.

These reactions are referred to as a rule as Mannich or Mannich-analogous reactions.

Formaldehyde sources suitable for the reaction according to b) or c) are formalin solutions, formaldehyde oligomers, e.g. trioxane, and polymers of formaldehyde, such as paraformaldehyde. Paraformaldehyde is preferably used. Formalin solution is particularly easy to handle. Of course, gaseous formaldehyde may also be used.

Suitable amines for the reaction according to b) have at least one secondary amino function and, if required, one or more tertiary amino functions. What is important is that the amines reacted according to b) have no primary amino function, since otherwise larger amounts of undesired oligomerization products may occur. In the context of this invention, primary amino functions are amino functions of the formula $HNR^4R^5$, where one of the radicals $R^4$ or $R^5$ is hydrogen and the other radical is chosen from substituents other than hydrogen. In the context of this invention, secondary amino functions are amino functions of the formula $HNR^4R^5$, where $R^4$ and $R^5$ are chosen from substituents other than hydrogen. If amines which have no primary amino function and only one, two or three secondary amino functions, preferably only one secondary amino function, are used for the reaction according to b) nitrogen-containing Mannich adducts can be prepared with high selectivity, substantially independently of the order of combination of the reactants, the product spectrum being easily controllable by means of the chosen stoichiometry of the components polyisobutenylphenol, amine and formaldehyde source.

Suitable amines for the reaction according to c) have at least one primary or secondary amino function. Amines suitable for the reaction according to c) may have one or more primary amino functions and/or one or more secondary amino functions and moreover further tertiary amino functions. What is important for the preparation of the novel Mannich adducts by this variant is that an adduct is formed from at least one amine and a formaldehyde source or a formaldehyde equivalent in the absence of the polyisobutenylphenol, and this adduct is only then reacted with the polyisobutenylphenol. Starting from amines which have one or more primary amino groups, this process too leads to the formation of the novel, advantageous Mannich adducts having a high proportion of nitrogen-containing compounds and mixtures having a molecular weight distribution substantially narrower than the prior art.

Secondary amines reacted under b) lead, substantially independently of the order of combination of the reactants, to the selective formation of comparatively uniform amine-containing Mannich adducts. This is presumably due to the fact that the Mannich adducts formed starting from secondary amines are no longer capable of reacting with further formaldehyde and/or polyisobutenylphenol to give higher adducts (e.g. oligomers and polymers). Independently of the order of combination of the reactants, as described under c), the generally higher reactivity of secondary amines with respect to nucleophiles may lead to prior formation of adducts of formaldehyde and amine(s). This would be in agreement with the good selectivity also found for the novel process carried out according to c).

In the amines of the formula $HNR^4R^5$, $R^4$ and $R^5$ are preferably chosen from hydrogen and $C_1$- to $C_{20}$-alkyl, $C_3$- to $C_8$-cycloalkyl and $C_1$- to $C_{20}$-alkoxy radicals which may be interrupted and/or substituted by heteroatoms selected from N and O, it being possible for the heteroatoms in turn to carry substituents, preferably selected from H, $C_1$-$C_6$-alkyl, aryl and hetaryl; or $R^4$ and $R^5$, together with the N atom to which they are bonded, form a 5-, 6- or 7-membered cyclic structure which may have one or two heteroatoms selected from N and O and may be substituted by one, two or three $C_1$- to $C_6$-alkyl radicals. Furthermore, $R^4$ and $R^5$ may be aryl or hetaryl. Aryl and hetaryl radicals may have from one to three substituents selected, for example, from hydroxyl and the abovementioned alkyl, cycloalkyl or alkoxy radicals and polyisobutenyl radicals.

Examples of suitable radicals $R^4$ and $R^5$ are hydrogen, methyl, ethyl, n-propyl, sec-propyl, isopropyl, n-butyl, isobutyl, sec-butyl, tert-butyl, n-pentyl and n-hexyl, 5-, 6- and 7-membered saturated, unsaturated or aromatic carbocyclic and heterocyclic structures, such as cyclopentyl, cyclohexyl, phenyl, tolyl, xylyl, cycloheptyl, naphthyl, tetrahydrofuranyl, tetrahydropyranyl, dioxanyl, pyrrolidyl, piperidyl, pyridyl and pyrimidyl.

Suitable compounds of the formula $HNR^4R^5$ which have exclusively a primary amino function are, for example, methylamine, ethylamine, n-propylamine, isopropylamine, n-butylamine, isobutylamine, sec-butylamine, tert-butylamine, pentylamine, hexylamine, cyclopentylamine, cyclohexylamine, aniline and benzylamine.

Suitable compounds of the formula $HNR^4R^5$ which have exclusively a primary amino function and in which $R^4$ or $R^5$ is alkyl interrupted and/or substituted by the heteroatom O are, for example, $CH_3$—O—$C_2H_4$—$NH_2$, $C_2H_5$—O—$C_2H_4$—$NH_2$, $CH_3$—O—$C_3H_6$—$NH_2$, $C_2H_5$—O—$C_3H_6$—$NH_2$, n-$C_4H_9$—O—$C_4H_8$—$NH_2$, HO—$C_2H_4$—$NH_2$, HO—$C_3H_7$—$NH_2$ and HO—$C_4H_8$—$NH_2$.

Suitable compounds of the formula $HNR^4R^5$ which have exclusively a secondary amino function are, for example, dimethylamine, diethylamine, methylethylamine, di-n-propylamine, diisopropylamine, diisobutylamine, di-sec-butylamine, di-tert-butylamine, dipentylamine, dihexylamine, dicyclopentylamine, dicyclohexylamine and diphenylamine.

Suitable compounds of the formula $HNR^4R^5$ which have exclusively a secondary amino function and in which $R^4$ and $R^5$ are alkyl interrupted and/or substituted by the heteroatom O are, for example, $(CH_3-O-C_2H_4)_2NH$, $(C_2H_5-O-C_2H_4)_2NH$, $(CH_3-O-C_3H_6)_2NH$, $(C_2H_5-O-C_3H_6)_2NH$, $(n-C_4H_9-O-C_4H_8)_2NH$, $(HO-C_2H_4)_2NH$, $(HO-C_3H_6)_2NH$ and $(HO-C_4H_8)_2NH$.

Suitable compounds of the formula $HNR^4R^5$ in which $R^4$ and $R^5$, together with the N atom to which they are bonded, form a 5-, 6- or 7-membered cyclic structure which may have one or two heteroatoms selected from N and O and may be interrupted by one, two or three $C_1$- to $C_6$-alkyl radicals are, for example, pyrrolidine, piperidine, morpholine and piperazine and their substituted derivatives, such as N—$C_1$- to $C_6$-alkylpiperazines and dimethylmorpholine.

Suitable compounds of the formula $HNR^4R^5$ which have alkyl radicals interrupted and/or substituted by N are alkylenediamines, dialkylenetriamines, trialkylenetetramines and polyalkylenepolyamines, such as oligo- or polyalkyleneimines, in particular oligo- and polyethyleneimines, preferably oligoethyleneimines, consisting of from 2 to 20, preferably from 2 to 10, particularly preferably 2 or 3, ethyleneimine units. In particular, those compounds, such as n-propylenediamine, 1,4-butanediamine, 1,6-hexanediamine, diethylenetriamine and triethylenetetramine, and their alkylation products, which have at least one primary or secondary amino function, e.g. 3-(dimethylamino)-n-propylamine, N,N-dimethylethylenediamine, N,N-diethylethylenediamine and N,N,N',N'-tetramethyldiethylenetriamine, are suitable. Ethylenediamine is likewise suitable.

Further suitable compounds of the formula $HNR^4R^5$ are the reaction products of alkylene oxides, in particular ethylene oxide, with primary amines, and copolymers of ethylene oxide with ethyleneimine and/or primary or secondary $C_1$- to $C_6$-alkylamines.

Preferred compounds of the formula $HNR^4R^5$ are 3-(dimethylamino)-n-propylamine, di[3-(dimethylamino)-n-propyl]amine, di[3-(diethylamino)-n-propyl]amine, di[2-(dimethylamino)ethyl]amine, dimethylamine, diethylamine, di-n-propylamine, diisopropylamine, dicyclohexylamine, pyrrolidine, piperidine, morpholine, dimethylmorpholine, N-methylpiperazine, $HO-C_2H_4-NH_2$, $(HO-C_2H_4)_2NH$, $H_3C-O-(CH_2)_2-NH_2$, $H_3C-O-(CH_2)_3-NH_2$, $HO-(CH_2)_3-NH_2$, diethylenetriamine, triethylenetetramine, N,N-diethylethylenediamine and N,N,N',N'-tetramethyldiethylenetriamine.

Particularly preferred compounds of the formula $HNR^4R^5$ are 3-(dimethylamino)-n-propylamine, di[3-(dimethylamino)-n-propyl]amine, dimethylamine, diethylamine, di-n-propylamine and morpholine.

The reaction temperatures suitable for the reaction b) depend on a number of factors. In the case of the (Mannich) reaction in step b), water of reaction is formed. As a rule, this is removed from the reaction mixture. The water of reaction can be removed during the reaction, at the end of the reaction time or after the reaction is complete, for example by distillation. Advantageously, the water of reaction can be removed by heating the reaction mixture in the presence of entraining agents. Examples of suitable entraining agents are organic solvents which form an azeotropic mixture with water and/or have a boiling point above the boiling point of water.

Particularly suitable entraining agents are paraffins, benzene and alkylaromatics, in particular toluene, xylenes and mixtures of alkylaromatics with other (high-boiling) hydrocarbons. As a rule, the water of reaction is removed at a temperature which roughly corresponds to the boiling point of the entraining agent or of the azeotropic mixture of water and entraining agent.

Suitable temperatures for removing the water of reaction are therefore from 75 to 200° C., preferably from 80 to 180° C., particularly preferably from 80 to 150° C., at atmospheric pressure. If the water of reaction is removed at reduced pressure, the temperature should be reduced in accordance with the lower boiling points.

The reaction temperatures for the (Mannich) reaction in step b) are preferably from 10 to 200° C., in particular from 20 to 180° C., e.g. about 35° C., about 90° C., about 120° C. or about 140° C.

The reaction described under b) can be carried out, for example, by combining polyisobutenylphenol, amine and formaldehyde source and bringing the reaction mixture to the desired reaction temperature, preferably into the abovementioned temperature ranges. The reaction described under b) can also be carried out by first adding the formaldehyde source to the polyisobutenylphenol and, if required, a solvent and if necessary heating the mixture to the reaction temperature and then adding at least one secondary amine. The amine may be added in one portion or over a period of from 5 to 300, preferably from 10 to 150, minutes by adding a plurality of portions or continuous addition. The reaction described under b) can also be carried out by first combining polyisobutenylphenol and, if required, solvent and amine, if necessary heating to the reaction temperature and then adding the formaldehyde source, it being possible to carry out the addition of the formaldehyde source as described above for the amine.

In a preferred embodiment, step b), i.e. the (Mannich) reaction and the removal of the water of reaction, is carried out at about atmospheric pressure and about 80° C., about 110° C. or about 130° C. using aromatic solvents, preferably toluene, xylenes or mixtures thereof, as entraining agents. Step b) is preferably carried out by combining the reactants at from 10 to 50° C., if necessary mixing them for from 10 to 300 minutes in this temperature range and then bringing them, in the course of from 5 to 180, preferably from 10 to 120, minutes to the temperature required for removing the water of reaction by distillation.

The total reaction time for the conversion of the polyisobutenylphenols into the Mannich adducts in step b) is in general from 10 minutes to 24 hours, preferably from 30 minutes to 16 hours, particularly preferably from 60 minutes to 8 hours.

In the Mannich reaction carried out under b) or c), as a rule from 0.5 to 3.0, preferably from 0.5 to 2.0, in particular from 0.8 to 1.5, mol of formaldehyde (or a corresponding amount of a formaldehyde source) and from 0.5 to 3.0, preferably from 0.5 to 2.0, in particular from 0.8 to 1.5, mol of secondary amine, based on 1 mol of polyisobutenylphenol from a), are used.

The reactants formaldehyde source, secondary amine and polyisobutenylphenol in step b) are particularly preferably used in a roughly equimolar ratio or a ratio of about 2:2:1 or about 1:2:1. As a rule, a substantially uniform product spectrum with a high proportion of amine-containing compounds can thus be achieved. A roughly equimolar ratio of the reactants and a 1:2:1 ratio of the reactants lead to the preferred formation of monoaminomethylated compounds. A reactant ratio of about 2:2:1 leads to the preferred formation of bisaminomethylated compounds.

When the process is carried out as described under c), first an adduct of formaldehyde or a formaldehyde equivalent, such as dichloromethane or dibromomethane or dimethoxymethane, an amine, and, if required, a solvent is prepared by combining the components and, if required, with heating to temperature ranges described above for b) and within the reaction times described above for b), preferably from 5 to 180, in particular from 10 to 90, minutes. During or after the reaction of amine and formaldehyde source, resulting water of reaction can if desired be removed, for example as described above. The water can also be removed by water-binding agents, such as KOH, NaOH, CaO or $Na_2SO_4$. The reaction product thus obtained and comprising the amine and formaldehyde can, if desired, be purified and/or isolated. In particular, the adducts obtainable by reacting one equivalent of formaldehyde or one equivalent of a formaldehyde equivalent with one or two equivalents of a secondary amine or one equivalent of a primary amine and after removal of the resulting water of reaction, alcohol or halide (secondary amine: methyleneiminium ion or aminal; primary amine: imine) can, if desired, be isolated, purified and/or stored for a subsequent reaction with the polyisobutenylphenol. The reaction product obtained from amine and formaldehyde or formaldehyde equivalent and the polyisobutenylphenol are then mixed with one another, it being possible to carry out the combination in one portion, in a plurality of portions or continuously in the periods stated above. Reaction temperatures and reaction times are usually in the ranges as described above for the reaction procedures according to b). If the reaction product obtained from formaldehyde or formaldehyde equivalent and amine is isolated, the reaction with the polyisobutenylphenol is preferably carried out in such a way that the polyisobutenylphenol and, if required, the solvent are initially taken, the initially taken mixture is, if required, heated to a temperature of from 50 to 100° C. and the adduct obtained from amine and formaldehyde or formaldehyde equivalent is then added. Said adduct is then preferably added over a period of from 5 minutes to 10 hours, in particular from 10 minutes to 4 hours, and the reaction mixture is stirred for a further 10 minutes to 5 hours, preferably 30 minutes to 4 hours, to a suitable reaction temperature. If desired, the amine formed in the reaction of aminals with the polyisobutenylphenol can be distilled off and/or removed under reduced pressure, depending on the volatility of the amine.

If the reaction described under c) is carried out without isolating the adduct of formaldehyde or formaldehyde equivalent and amine(s), preferably the formaldehyde source or the formaldehyde equivalent and amine are first combined, if necessary heated and thoroughly mixed over a period of, as a rule, at least 5 minutes, preferably from 10 minutes to 4 hours, in particular from 20 minutes to 60 minutes, and the polyisobutenylphenol is added to the adduct. For this purpose, the polyisobutenylphenol is preferably added to the adduct in the initially taken mixture. The mixture is preferably heated to a suitable reaction temperature for from 10 minutes to 6 hours, in particular from 30 minutes to 4 hours. Suitable reaction temperatures for this purpose are, for example, from 25 to 120° C., in particular from 50 to 100° C.

When using primary amines according to c), the adduct used is preferably an N-alkylmethyleneimine which may have been isolated beforehand, the N-alkyl radical preferably being derived from the abovementioned radicals $R^4$ or $R^5$. Such N-alkylmethyleneimines tend to trimerize, so that they usually include N,N',N"-trialkyltetrahydrotriazines. These mixtures, as well as pure tetrahydrotriazines, can also be used.

When secondary amines are used according to c), the adduct used is preferably a hemiaminal, methyleneiminium ion or aminal which may have been isolated beforehand, the amino functions of the hemiaminal, methyleneiminium ion or aminal preferably being derived from the abovementioned secondary amines $HNR^4R^5$.

The adduct used according to c) is preferably an adduct of at least one amine and a formaldehyde source, which adduct is obtained by reacting the two reactants for at least 15, for example about 30, about 60 or about 90, minutes at above +15° C., preferably above +20° C., e.g. at from 20 to 30° C. or from about 20 to 50° C. If required, subsequently formed water of reaction can be removed under the conditions as described above for b), for example by distillation or adsorption.

Suitable solvents for the reaction according to c) are the solvents and entraining agents described for the reaction according to b), and hydrocarbons and hydrocarbon mixtures having boiling points or boiling ranges of from +35 to +110° C., alcohols, $C_2$-$C_6$-dialkyl ethers, cyclic mono- and diethers of 3 to 6 carbon atoms, in particular ethanol, isopropanol, butanols, tetrahydrofuran, tetrahydropyran and dioxane.

By means of the procedure described under c), it is possible in many cases to achieve a particularly uniform product spectrum substantially independently of the amine used, in particular if the reactants are used in about equimolar amounts or in a stoichiometric ratio of formaldehyde or formaldehyde equivalent, amine and polyisobutenylphenol of about 1:2:1 or about 2:2:1 or about 2:1:1.

The adduct used according to c) is preferably an aminal of formaldehyde with a secondary amine, selected from di-$C_1$-$C_8$-alkylamine whose alkyl groups may be substituted by an $N(C_1$-$C_4$-alkyl$)_2$ group, and cyclic amines which have 4 to 6 carbon atoms and whose cyclic structure may be interrupted by O and/or N—$C_1$-$C_4$-alkyl.

Suitable aminals for the reaction described above are, for example, N,N,N',N'-tetramethylmethylenediamine, N,N,N', N'-tetraethylmethylenediamine, bis{di[3-(dimethylamino)-n-propyl]amino}methane, bis(morpholino)methane and bis (4-methylpiperazino)methane.

In a further embodiment of step c), the polyisobutenylphenols can be subjected to an analogous reaction with hemiaminals to give Mannich adducts. Such hemiaminals are obtainable from formaldehyde sources or formaldehyde equivalents and secondary amines which have no primary amino function, and can be produced in a one-pot reaction in the presence of the polyisobutenylphenols (variant b)) or prepared separately (variant c)). Such hemiaminals can be etherified with $C_1$-$C_{12}$-alkanols or esterified with $C_1$-$C_{12}$-carboxylic acids. Suitable hemiaminals are, for example, N-hydroxymethylmorpholine and N-hydroxymethyldiisopropylamine.

By means of the procedures described above under b) and c), the polyisobutenylphenol can be converted into bisaminomethylated Mannich adducts through the choice of the stoichiometry. For the preparation of the bisadducts, formaldehyde (or a formaldehyde source or formaldehyde equivalent) and/or amines or imines, aminals or hemiaminals are preferably used in a two-fold to three-fold excess and, if required, the reaction time is prolonged.

In a preferred embodiment of the novel process, the formaldehyde source or the formaldehyde equivalent, preferably formalin solution or paraformaldehyde, is, if required, first initially taken in a solvent, and a roughly equimolar amount of a primary amine, preferably of an amine having only one primary and no secondary amino group, is added at from +15 to +50° C., preferably from +20 to +35° C. The mixture is then thoroughly mixed for from 5 to 90, preferably from 15 to 60, minutes at a temperature in the range stated above and is then combined with the polyisobutenylphenol from step a) and, if required, further solvent. Thereafter, the mixture thus obtained is heated, for example under reflux, for from 30 minutes to 6 hours, preferably from 1 to 3 hours, to a temperature of from 40 to 100° C., preferably from 50 to 90° C. The reaction mixture can, if desired, then be purified, for example by filtration and/or removal of volatile components, for example under reduced pressure or by distillation.

In a further preferred embodiment of the novel process, the reaction product obtained under a) and, if required, solvent are initially taken and the mixture is heated to a temperature of from 40 to 100° C., preferably from 50 to 90° C., for example while refluxing the solvent. Thereafter, either a roughly equimolar amount or from 1.7 to 2.5 equivalents, e.g. about 2 equivalents, of an aminal, for example a tetra-$C_1$-$C_4$-alkylmethylenediamine, if required in a solvent, is slowly added at this temperature, for example over a period of from 30 minutes to 6 hours, preferably from 2 to 5 hours, and the reaction mixture is allowed to react for a further 30 minutes to 4 hours, in particular from 1 to 3 hours, at a temperature in the abovementioned ranges. If required, the reaction mixture can then be purified, for example by filtration and/or removal of the volatile components under reduced pressure or by distillation.

Suitable solvents for the two embodiments of step c) which are described above are hydrocarbons, hydrocarbon mixtures, ethers or alcohols having a boiling point or boiling range of from 40 to 100° C., in particular from 50 to 90° C. In particular, tetrahydrofuran and dioxane are suitable.

In a further preferred embodiment of the reaction of the reaction product obtained, polyisobutenylphenol from step a) and, if required, solvent are first initially taken. Thereafter, about equimolar amounts of a formaldehyde source and of a secondary amine, preferably an amine having exclusively a secondary amino function, and, if required, solvent are slowly added, for example by dropwise addition. The components are then mixed for a further 20 minutes to 3 hours, preferably from 30 to 90 minutes, and the mixture is then heated for a further 30 minutes to 4 hours, preferably from 1 to 3 hours, to a temperature of from 40 to 100° C., preferably from 50 to 90° C. The reaction mixture can then be purified, for example with filtration and/or removal of the volatile components under reduced pressure or by distillation. Suitable solvents are in particular the solvents stated in the preferred embodiments described above. Isopropanol is preferred.

In a further preferred embodiment, polyisobutenylphenol and a roughly equimolar amount of a secondary amine, preferably having exclusively a secondary amino group, in a solvent are initially taken. Thereafter a roughly equimolar amount of a formaldehyde source is slowly added. The reaction mixture is preferably heated to a temperature of from 30 to 70° C., preferably from 40 to 60° C. during the addition of the formaldehyde source. The reaction mixture is then heated for from 1 to 6, preferably from 2 to 4, hours to a temperature of from 80 to 130° C., preferably from 90 to 120° C., particularly preferably until the solvent refluxes. The resulting water of reaction is preferably removed by distillation. Particularly suitable solvents for this embodiment are aromatic solvents or mixtures thereof with further high-boiling hydrocarbons. Xylenes and toluene and mixtures thereof are particularly suitable, toluene being preferred.

As a rule, the novel processes give adduct mixtures which comprise at least 40, frequently at least 50, particularly preferably at least 60, mol % of compounds of the formula Ia and/or Ib

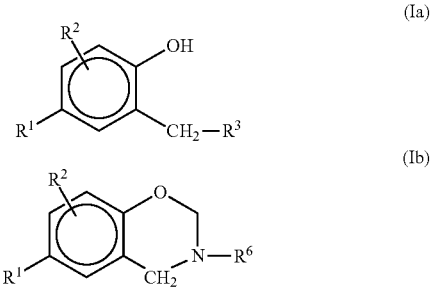

where
$R^1$ is a terminally bonded polyisobutenyl radical,
$R^2$ is H, $C_1$- to $C_{20}$-alkyl, $C_1$- to $C_{20}$-alkoxy, hydroxyl, a polyalkylene radical or $CH_2NR^4R^5$, where $R^4$ and $R^5$ have the meanings stated below, and
$R^3$ is $NR^4R^5$, where $R^4$ and $R^5$, independently of one another, are selected from H, $C_1$- to $C_{20}$-alkyl, $C_3$- to $C_8$-cycloalkyl and $C_1$- to $C_{20}$-alkoxy radicals which may be interrupted and/or substituted by heteroatoms selected from N and O, and phenol radicals of the formula II,

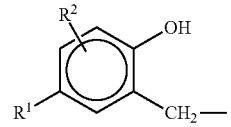

where $R^1$ and $R^2$ are as defined above;
with the proviso that $R^4$ and $R^5$ are not simultaneously H or phenol radicals of the formula II; or $R^4$ and $R^5$, together with the N atom to which they are bonded, form a 5-, 6- or 7-membered cyclic structure which has one or two heteroatoms selected from N and O and may be substituted by one, two or three $C_1$- to $C_6$-alkyl radicals; and
$R^6$ is a radical $R^4$ or $R^5$ other than H.

The compounds of the formula Ib (dihydrobenzoxazines) can be formed in the presence of formaldehyde sources or formaldehyde equivalents from compounds of the formula Ia, where $R^4$ or $R^5$ is H.

Preferred radicals $R^1$ to $R^6$ are derived from the polyisobutenes, phenols, formaldehyde sources or formaldehyde equivalents and amines described above.

Preferably, the Mannich adducts of the formula Ia and/or Ib are monomolecular polyisobutenylphenol-amines which have only one polyisobutenylphenol unit per molecule. Oligomeric polyisobutenylphenolamines having two, three or more polyisobutenylphenol units per molecule are formed only in a small amount, if at all.

In many cases, the novel process gives an adduct mixture which contains at least 40, frequently at least 50, particularly preferably at least 60, mol % of a compound selected from compounds of the formula Ia or Ib. The preferred embodiments of the novel process can be a mixture of Mannich adducts or chemically uniform Mannich adducts which comprises at least 70 or at least 80 mol % of compounds of the formula Ia and/or Ib.

If desired, the products obtained by the novel processes may be further purified, for example by extraction, distillation or column chromatography, in particular as described below.

The present invention furthermore relates to the Mannich adducts of the formulae Ia and Ib which are obtained by the novel process, in the form of their pure substances.

In a preferred embodiment the adduct mixture comprises at least 40, in particular at least 50, particularly preferably at least 60, mol % of at least one compound selected from the N- or N,N-substituted derivatives of N,N-bis(2-hydroxy-5-polyisobutenylbenzyl)amine (e.g. compounds of the formula Ia, where $R^2$ is H, $R^3$ is $NR^4R^5$, $R^4$ is a phenol radical of the formula II whose radical $R^2$ is likewise H, and $R^5$ is a radical other than H and other than phenol radicals of the formula II), 2-aminomethyl-4-polyisobutenylphenols (e.g. compounds of the formula Ia, where $R^2$ is H, $R^3$ is $NR^4R^5$, $R^4$ and $R^5$ are radicals other than phenol radicals of the formula II and $R^4$ and $R^5$ are not simultaneously H), 2,6-bisaminomethyl-4-polyisobutenylphenols (e.g. compounds of the formula Ia, where $R^2$ is $CH_2NR^4R^5$ in the ortho position, $R^3$ is $NR^4R^5$, and $R^4$ and $R^5$ are radicals other than phenol radicals of the formula II and $R^4$ and $R^5$ are not simultaneously H) and 3,4-dihydro-1,3-2H-benzoxazines (e.g. compounds of the formula Ib, where $R^2$ is H and $R^6$ is a radical $R^4$ or $R^5$ other than H).

In a further preferred embodiment, the adduct mixture contains at least 40, in particular at least 50, particularly preferably at least 60, mol % of N- or N,N-substituted derivatives of 2-aminomethyl-4-polyisobutenylphenol (e.g. compounds of the formula Ia, where $R^2$ is H, $R^3$ is $NR^4R^5$, $R^4$ and $R^5$ are radicals other than phenol radicals of the formula II and $R^4$ and $R^5$ are not simultaneously H) and/or 3,4-dihydro-1,3-2H-benzoxazine (e.g. compounds of the formula Ib, where $R^2$ is H and $R^6$ is a radical $R^4$ or $R^5$ other than H). These are referred to as mono-Mannich adducts.

In a preferred embodiment, the Mannich adducts obtainable by the process of the invention include little if any alkylation product of step a) that has not been further reacted. Since the Mannich reaction is an equilibrium reaction, the product will normally include a residual fraction of alkylation products from step a). The fraction in the Mannich adducts which is polyisobutenyl-phenol which has not been further reacted is typically from 0 to 20 mol %, usually from 1 to 15 mol %, especially from 5 to 10 mol %, based on the total amount of the adduct mixture obtained. The polyisobutenylphenol fraction can be set to a desired value via the reaction management of steps b) and c) or customary separation processes. A preferred separation process is the hereinafter described column chromatography. Since, however, a residual fraction of alkylation products which have not been reacted further is surprisingly not troublesome and frequently even advantageous, it is generally possible to dispense not only with inconvenient process measures for an ideally complete reaction in steps b) and c) but also with further separating steps.

The Mannich adduct mixtures described above, in particular the nitrogen-containing components can be fractionated by column chromatography over stationary phases. The fractionation can be effected by means of one-stage or multistage elution. Suitable eluents are, for example, hydrocarbons, alcohols, ketones, water and mixtures thereof, to which bases, e.g. amines or alkalis, may be added. The fractionation can advantageously be carried out by multistage elution, preferably with at least one hydrocarbon and then at least one basic alcohol/water mixture.

Particularly suitable stationary phases are oxides, as are usual in column chromatography. Acidic oxides, such as acidic alumina, are preferred, acidic silica gel being particularly preferred. A preferably used basic alcohol/water mixture is a mixture comprising a) from 75 to 99.5, in particular from 85 to 98, particularly preferably from 90 to 97, % by weight of at least one $C_2$-$C_4$-alcohol, in particular ethanol and/or isopropanol, particularly preferably isopropanol, b) from 0.4 to 24.4% by weight of water and c) from 0.1 to 15, in particular from 0.5 to 10, particularly preferably from 1 to 5, % by weight of at least one amine which is volatile at room temperature.

Suitable amines volatile at room temperature are, for example, ammonia, mono-$C_1$-$C_8$-alkylamines, di-$C_1$-$C_8$-alkylamines and tri-$C_1$-$C_4$-alkylamines, in particular ammonia, methylamine, ethylamine, n-propylamine, isopropylamine, dimethylamine, diethylamine, di-n-propylamine, diisopropylamine, di-n-butylamine, di-sec-butylamine, di-tert-butylamine, trimethylamine, triethylamine, diisopropylethylamine and triisopropylamine. Ammonia is particularly preferred.

As a rule, the fractionation is carried out by column chromatography in such a way that the adduct mixture is added to a column filled with a stationary phase and, if required, conditioned. If necessary, in a first step, the column with the added adduct mixture can then be washed with a nonpolar solvent, for example an aliphatic or aromatic hydrocarbon. This makes it possible, for example, to elute fractions not containing amines. The fractionation of the adduct mixture, in particular of the amine-containing components, is effected by, preferably, multistage elution with an alcohol/water mixture as described above. The elution can be carried out with an alcohol/water mixture of either constant composition or variable composition, for example by means of a one-stage or multistage gradient or a continuous gradient.

The process as described above can be used on the one hand for isolating those components of the adduct mixture which do not contain amines and then recovering the unfractionated amine-containing components of the adduct mixture. On the other hand, those components of the adduct mixture which do not contain nitrogen can, if required, be first isolated and the nitrogen-containing components then fractionated. With a suitable separation efficiency of the column used, the adduct mixtures can, if desired, be fractionated down to the individual compounds.

Preferably, adduct mixtures having a polydispersity of from 1.05 to 3.5, in particular from 1.1 to 2.5, particularly preferably from 1.1 to 1.9, are obtainable by the novel process.

The desired polydispersity can be established by a careful choice of the starting materials, choice of the stoichiometry, choice of the temperature and reaction time and possibly of the working up, in particular by conventional purification techniques, such as extraction and distillation and, if required, the novel fractionation by column chromatography.

Suitable measures which, individually or in combination, promote the formation of adduct mixtures having high activity and/or low polydispersity are, for example, selected from
use of polyisobutenes of low polydispersity,
use of polyisobutenes having very high proportions of terminal double bonds,
use of the polyisobutenes in less than the stoichiometric amount in the alkylation of the phenols, if necessary followed by subsequent removal of the unconverted phenols,
carrying out the alkylation at a temperature which is as low as possible but still ensures complete conversion, for example at above about +5° C. and below about +30° C.,
maintaining a suitable stoichiometry, for example a formaldehyde source:amine:polyisobutenylphenol ratio of about 1:1:1 or about 1:2:1 (for the preparation of mono- Mannich adducts) or 2:2:1 (for the preparation of bis-Mannich adducts) or 2:1:1 (leads to the formation of oxazines when primary amines are used) or 2:1:2, where in the last case a primary amine is preferably used (leads to the preparation of bisarylmonoamines), carrying out the reaction of the reaction product obtained according to a) with an adduct of amine and formaldehyde or formaldehyde equivalent according to c), in particular according to the preferred embodiments described above, removal of the adducts which do not contain amine from the mixture by fractionation by column chromatography, fractionation of the amine-containing adducts of the mixture by column chromatography, preferably over acidic stationary phases by elution with basic alcohol/water mixtures.

The present invention furthermore relates to a Mannich adduct obtainable by a process as described above.

The present invention also relates to a Mannich adduct containing at least one compound of the formula Ia and/or Ib.

The present invention also relates to the use of at least one above-defined Mannich adduct as a detergent additive in fuel and lubricant compositions, if necessary in combination with further conventional fuel and lubricant additives and in particular with the additional components described below.

Examples of such additional components are further additives having a detergent action or having an action which inhibits valve seat wear, these comprising at least one hydrophobic hydrocarbon radical having a number average molecular weight ($M_N$) of from 85 to 20,000 and at least one polar group selected from (a) mono- or polyamino groups having up to 6 nitrogen atoms, at least one nitrogen atom having basic properties,
(b) nitro groups, if required in combination with hydroxyl groups,
(c) hydroxyl groups in combination with mono- or polyamino groups, at least one nitrogen atom having basic properties,
(d) carboxyl groups or their alkali metal or alkaline earth metal salts,
(e) sulfo groups or their alkali metal or alkaline earth metal salts,
(f) polyoxy-$C_2$- to $C_4$-alkylene groups which are terminated by hydroxyl groups or mono- or polyamino groups, at least one nitrogen atom having basic properties, or by carbamate groups,
(g) carboxylic ester groups,
(h) groups derived from succinic anhydride and having hydroxyl and/or amino and/or amido and/or imido groups, and
(i) groups produced by conventional Mannich reaction of phenolic hydroxyl groups with aldehydes and mono- or polyamines.

Examples of the above additive components having a detergent action or having an action which inhibits valve seat wear are: additives containing mono- or polyamino groups (a) are preferably polyalkenemono- or polyalkenepolyamines based on polypropene or on highly reactive (i.e. having predominantly terminal double bonds, generally in the β- and γ-positions) or conventional (i.e. having predominantly central double bonds) polybutene or polyisobutene which have an $M_N$ of from 300 to 5000 and were not obtained by the novel process. Such additives based on highly reactive polyisobutene, which can be prepared from the polyisobutene which may contain up to 20% by weight of n-butene units by hydroformylation and reductive amination with ammonia, monoamines or polyamines, such as dimethylaminopropylamine ethylenediamine, diethylenetriamine, triethylenetetramine or tetraethylenepentamine, are disclosed in particular in EP-A 244 616. If polybutene or polyisobutene having predominantly central double bonds (generally in the β and γ positions) is used as a starting material in the preparation of the additives, the preparation by chlorination and the subsequent amination or by oxidation of the double bond with air or ozone to give the carbonyl or carboxyl compound and subsequent amination under reductive (hydrogenating) conditions is a possible method. Here, the amines used for the amination may be the same as those used above for the reductive amination of the hydroformylated highly reactive polyisobutene. Corresponding additives based on polypropene are described in particular in WO-A 94/24231.

Further preferred additives containing monoamino groups (a) are the hydrogenation products of the reaction products of polyisobutenes having an average degree of polymerization P of from 5 to 100 with oxides of nitrogen or mixtures of oxides of nitrogen and oxygen, as described in particular in WO-A 97/03946.

Further preferred additives containing monoamino groups (a) are the compounds obtainable from polyisobutene epoxides by reaction with amines and subsequent dehydration and reduction of the amino alcohols, as described in DE-A 196 20 262.

Additives containing nitro groups, if required in combination with hydroxyl groups (b), are preferably reaction products of polyisobutenes having an average degree of polymerization P of from 5 to 100 or from 10 to 100 with oxides of nitrogen or mixtures of oxides of nitrogen and oxygen, as described in particular in WO-A 96/03367 and WO-A 96/03479. These reaction products are as a rule mixtures of pure nitropolyisobutanes (e.g. α,β-dinitropolyisobutane) and mixed hydroxynitropolyisobutanes (e.g. α-nitro-β-hydroxy-polyisobutane).

Additives containing hydroxyl groups in combination with mono- or polyamino groups (c) are in particular reaction products of polyisobutene epoxides, obtainable from polyisobutene having preferably predominantly terminal double bonds and an $M_N$ of from 300 to 5000, with ammonia or mono- or polyamines, as described in particular in EP-A 476 485.

Additives containing carboxyl groups or their alkali metal or alkaline earth metal salts (d) are preferably copolymers of $C_2$-$C_{40}$-olefins with maleic anhydride having a total molar mass of from 500 to 20,000, some or all of whose carboxyl groups have been converted into the alkali metal or alkaline earth metal salts and a remainder of the carboxyl groups have been reacted with alcohols or amines. Such additives are disclosed in particular in EP-A 307 815. Such additives serve mainly for preventing valve seat wear and, as described in WO-A 87/01126 can advantageously be used in combination with conventional fuel detergents, such as poly(iso)buteneamines or polyetheramines.

Additives containing sulfo groups or their alkali metal or alkaline earth metal salts (e) are preferably alkali metal or alkaline earth metal salts of an alkyl sulfosuccinate, as described in particular in EP-A 639 632. Such additives serve mainly for preventing valve seat wear and can advantageously be used in combination with conventional fuel detergents, such as poly(iso)buteneamines or polyetheramines.

Additives containing polyoxy-$C_2$- to $C_4$-alkylene groups (f) are preferably polyethers or polyetheramines, which are obtainable by reaction of $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and the corresponding reaction products with ammonia.

Additives containing carboxylic ester groups (g) are preferably esters of mono-, di- or tricarboxylic acids with long-chain alkanols or polyols, in particular those having a minimum viscosity of 2 mPas at 100° C., as described in particular in DE-A 38 38 918. The mono-, di- or tricarboxylic acids used may be aliphatic or aromatic acids, and particularly suitable ester alcohols or ester polyols are long-chain members having, for example, 6 to 24 carbon atoms. Typical members of the esters are adipates, phthalates, isophthalates, terephthalates and trimellitates of isooctanol, of isononanol, of isodecanol and of isotridecanol. Such products also have carrier oil properties.

Additives containing groups derived from succinic anhydride and having hydroxyl and/or amino and/or amido and/or imido groups (h) are preferably corresponding derivatives of polyisobutenylsuccinic anhydride, which are obtainable by reaction of conventional or highly reactive polyisobutene having an $M_N$ of from 300 to 5000 with maleic anhydride by a thermal method or via the chlorinated polyisobutene. Of particular interest here are derivatives with aliphatic polyamines, such as ethylenediamine, diethylenetriamine, triethylenetetramine or tetraethylenepentamine. Such gasoline fuel additives are described in particular in U.S. Pat. No. 4,849,572.

Additives containing groups produced by conventional Mannich reaction of phenolic hydroxyl groups with aldehydes and mono- or polyamines (i) are preferably reaction products of polyisobutene-substituted phenols with formaldehyde and primary mono- or polyamines, such as ethylenediamine, diethylenetriamine, triethylenetetramine, tetraethylenepentamine or dimethylaminopropylamine. Such polyisobutene Mannich bases are described in particular in EP-A 831 141.

For a more exact definition of the individual gasoline fuel additives mentioned, the disclosures of the abovementioned prior art publications are hereby expressly incorporated by reference.

Suitable solvents or diluents (in the preparation of additive packets) are aliphatic and aromatic hydrocarbons, e.g. solvent naphtha.

Further conventional additive components which can be combined with the novel additives are, for example, corrosion inhibitors, for example based on ammonium salts of organic carboxylic acids, which salts tend to form films, on heterocyclic aromatics, antioxidants or stabilizers, for example based on amines, such as p-phenylenediamine, dicyclohexylamine or derivatives thereof or on phenols, such as 2,4-di-tert-butylphenol or 3,5-di-tert-butyl-4-hydroxyphenylpropionic acid, demulsifiers, antistatic agents, metallocenes, such as ferrocene or methylcyclopentadienylmanganesetricarbonyl, lubricity additives, such as specific fatty acids, alkenylsuccinc esters, bis(hydroxyalkyl)-fatty-amines, hydroxyacetamides or castor oil, and markers. If required, amines are also added for reducing the pH of the fuel.

Carrier oils, too, may be mentioned as further conventional components. Examples of these are mineral carrier oils (base oils), in particular those of the viscosity class solvent neutral (SN) 500 to 2000, synthetic carrier oils based on olefin polymers having an $M_N$ of from 400 to 1800, especially those based on polybutene or on polyisobutene (hydrogenated or unhydrogenated), on poly-alpha-olefins or poly(internal)olefins, and synthetic carrier oils based on alkoxylated long-chain alcohols or phenols. Polyalkenyl alcohol-polyetheramines, as described, for example, in DE-199 16 512.2, are also suitable as further additives.

The present invention furthermore relates to additive concentrates, in particular fuel additive concentrates and lubricant additive concentrates, particularly preferably fuel additive concentrates, containing, in addition to conventional additive components as defined above, at least one novel Mannich adduct in amounts of from 0.1 to 99.9, preferably from 0.5 to 80, in particular from 1.0 to 60, % by weight, based on the total weight of the concentrate.

The present invention furthermore relates to fuel compositions, especially gasoline fuel compositions, which contain the novel Mannich adducts, in particular Mannich adducts of the formula I, in effective amounts. In the case of fuel compositions, effective amounts are to be understood as a rule as meaning from 10 to 5000, in particular from 50 to 2000, ppm by weight, based on the total amount of the fuel composition.

The present invention also relates to lubricant compositions, in particular lubricant compositions which contain from 0.1 to 10, in particular from 0.5 to 5, % by weight, based on the total amount of the lubricant composition, of the novel Mannich adducts, in particular Mannich adducts of the formula Ia and/or Ib.

The novel polyisobutenylphenol-containing Mannich adducts, in particular polyisobutenylphenol-containing Mannich adducts of the formula I, have a high uniformity, a narrow molecular weight distribution and/or a high proportion of amine-containing compounds. As further illustrated in the following experimental section, they have an excellent action as gasoline fuel detergents which clean valves and keep valves clean. In addition, they do not have the initially described disadvantages of the polyalkylenylphenol Mannich adduct mixtures known from the prior art. Moreover, they have very advantageous viscosity behavior, in particular at low temperatures, which prevents formulation and application problems, e.g. sticking of valves.

EXAMPLES

The alkylation products and the Mannich adducts were characterized by means of $^1$H-NMR spectroscopy. For some of the Mannich adducts, only the chemical shifts (δ in ppm) of the characteristic signals of the methylene protons of the aminomethylene group are reported.

I. Preparation of the Polyisobutenylphenols

Ia. Alkylation with a Poylisobutene Having $M_N$=550

404.3 g of phenol were melted in a nitrogen atmosphere at from 40 to 45° C. in a 4 l four-necked flask. 191 g of BF$_3$-diethyl ether adduct were added dropwise and the mixture was cooled to 10° C. 1100 g of polyisobutene having an $M_N$ of 550 and a dimethylvinylidene content of 85%, dissolved in 1000 ml of hexane, were added dropwise in the course of 150 minutes at from 5 to 10° C. The mixture was allowed to warm up to room temperature in the course of 4 hours and was stirred overnight. The reaction was stopped by adding 1200 ml of 25% strength ammonia solution. The organic phase was separated off and then washed 8 times with 500 ml of water and dried over NaSO$_4$, and the solvent and small amounts of phenol were removed under reduced pressure: 1236 g of oil (polyisobutenylphenol).

¹H-NMR: 7.2 ppm (doublet, 2H), 6.7 ppm (doublet, 2H), 4.8 ppm (singlet, 1H), 1.75 ppm (singlet, 2H), 1.5-0.5 ppm (singlets, 78H).

This corresponds to an $M_N$ of 550 for the alkyl radical. The signal range of 7.1-6.75 ppm contains small signals which indicate the formation of from 5 to 10% of 2- or 2,4-substituted phenol.

Ib. Alkylation with a Polyisobutene Having $M_N$=1000

203.9 g of phenol were melted under nitrogen at from 40 to 45° C. in a 4 l four-necked flask. 95.5 g of $BF_3$-diethylether adduct were added dropwise and the mixture was cooled to 20 to 25° C. 998 g of polyisobutene having an $M_N$ of 1000 and a dimethylvinylidene content of 85%, dissolved in 1800 ml of hexane, were added dropwise in the course of 3 hours at from 20 to 25° C. Stirring was carried out overnight. The reaction was then stopped by adding 500 ml of 25% strength ammonia solution. The organic phase was separated off and then washed 7 times with 500 ml of water and dried over $NaSO_4$, and the solvent was removed under reduced pressure: 1060 g of oil (polyisobutenylphenol).

¹H-NMR: 7.2 ppm (doublet, 2H), 6.7 ppm (doublet, 2H), 4.8 ppm (singlet, broad 1H), 1.75 ppm (singlet, 2H), 1.5-0.5 ppm (singlets, 165H).

This corresponds to an $M_N$ of 1150 for the alkyl radical. The range from 7.1 to 6.75 contains small signals which indicate that, in addition to the main product (para-polyisobutenylphenol), from 5 to 10% of 2,4-substituted phenol had formed, which is in agreement with the small increase in molecular weight found.

Ic.

76.1 g of phenol were melted under nitrogen at from 40 to 45° C. in a 4 l four-necked flask. 28.4 g of $BF_3$-diethylether adduct were added dropwise and the mixture was cooled to 20 to 25° C. 914.5 g of polyisobutene having an $M_N$ of 2300 and a dimethylvinylidene content of 85%, dissolved in 1000 ml of hexane, were added dropwise in the course of 3 hours at from 20 to 30° C. Stirring was carried out overnight. The reaction was then stopped by adding 500 ml of 25% strength ammonia solution. The organic phase was separated off and then washed 7 times with 500 ml of water and dried over $NaSO_4$, and the solvent was removed under reduced pressure: 912 g of oil (polyisobutenylphenol).

¹H-NMR: 7.2 ppm (doublet, 2H), 6.7 ppm (doublet, 2H), 4.8 ppm (singlet, broad 1H), 1.75 ppm (singlet, 2H), 1.5-0.5 ppm (singlets, 330H).

This corresponds to an $M_N$ of 2310 for the alkyl radical.

II. Conversion of the Polyisobutenylphenols into Mannich Adducts

IIa.

320 g of polyisobutenylphenol from Example 1a in 200 ml of toluene were initially taken in a 4 l four-necked flask with a water separator. 43.9 g of morpholine were added, and 40.9 g of 37% strength formalin solution were added dropwise at 50° C. under nitrogen as an inert gas. Thereafter the reaction mixture was heated until the solvent refluxed, and water was removed in the course of 3 hours by distillation. The solution was filtered and the solvent was removed under reduced pressure: 352 g of oil (Mannich adduct).

¹H-NMR: 7.1 ppm (doublet, fine resolution, 1H), 6.9 ppm (singlet, fine resolution, 1H), 6.7 ppm (doublet, 1H), 3.8 ppm (4 multiplet, 4H), 3.7 ppm (singlet, 2H), 2.5 ppm (singlet, broad, 4H), 1.75 ppm (singlet, 2H), 1.5-0.5 ppm (singlets, 135H).

IIb.

260 g of polyisobutenylphenol from Example 1a were initially taken in a 1 l four-necked flask with a water separator. 12.6 g of paraformaldehyde in 74.8 g of di[3-(dimethylamino)-n-propyl]amine in 100 ml of isopropanol were then added dropwise, the temperature of the reaction mixture increasing to 38° C. The reaction mixture was stirred for 1 hour and was then refluxed for 2 hours. The reaction solution was filtered and the solvent ws removed under reduced pressure: 332 g of oil (Mannich adduct).

¹H-NMR: 7.1 ppm (doublet, fine resolution, 1H), 6.9 ppm (singlet, fine resolution, 1H), 6.6 ppm (doublet, 1H), 3.7 ppm (singlet, 1.5H), 3.7-3.2 ppm (3 singlets, 0.5H), 2.5 ppm (triplet, 4H), 2.2 ppm (triplett, 4H), 2.1 ppm (singlet, 12H), 1.75 ppm (singlet, 2H), 1.7 ppm (multiplet, 4H), 1.5-0.5 ppm (singlets, 78H).

These integrals correspond to a molecular weight $M_N$ of 546 for the alkyl radical.

IIc.

7.5 ml of 37% strength formalin solution in 30 ml of tetrahydrofuran were initially taken in a 500 ml four-necked flask. 3-(Dimethylamino)-n-propylamine was then added at from 20 to 25° C. Stirring was carried out for a further 30 minutes at this temperature, and 120 g of polyisobutenylphenol from Example 1a were then added. The reaction mixture was then refluxed for 2 hours. The reaction solution obtained was filtered and the solvent was removed under reduced pressure: 116 g of oil (Mannich adduct).

¹H-NMR: 7.1 ppm (doublet, fine resolution, 1H), 6.9 ppm (singlet, fine resolution, 1H), 6.6 ppm (doublet, 1H), 3.9 ppm (singlet, 2H), 2.5 ppm (triplet, 2H), 2.2 ppm (triplet, 2H), 2.1 ppm (singlet, 4.5H), 1.75 ppm (singlet, 2H), 1.7 ppm (multiplet, 2H), 1.5-0.5 ppm (singlets, 141H).

IId.

105 g of polyisobutenylphenol from Example 1b in 50 ml of tetrahydrofuran were initially taken in a 500 ml four-necked flask. The mixture was refluxed (from 75 to 80° C.), and 20.4 g of tetramethylmethylenediamine in 75 ml of tetrahydrofuran were added dropwise in the course of 4 hours and refluxing was continued for a further 2 hours. The solution was filtered and the solvent was removed under reduced pressure: 105 g of oil (Mannich adduct).

¹H-NMR: 7.1 ppm (doublet, fine resolution, 1H), 6.9 ppm (singlet, fine resolution, 1H), 6.7 ppm (doublet, 1H), 3.6 ppm (singlet, 2H), 2.25 ppm (singlet, 6H), 1.75 ppm (singlet, 2H), 2.2 ppm (triplet, 4H), 2.1 ppm (singlet, 12H), 1.75 ppm (singlet, 2H), 1.5-0.5 ppm (singlets, 141H)

These spectroscopic data correspond to an $M_N$ of 987 for the alkyl radical.

IIe.

119.4 g of polyisobutenylphenol from Example 1c and 100 ml of toluene were initially taken in a 0.5 l four-necked flask provided with a water separator. 4.8 g of morpholine were added, and 4.5 g of 37% strength formalin solution were added dropwise under nitrogen as an inert gas. Thereafter, the mixture was heated to reflux and water was removed by distillation in the course of 3 hours with vigorous refluxing. Thereafter, the solution was filtered and the solvent was removed under reduced pressure: 106 g of oil (Mannich adduct).

¹H-NMR: 7.1 ppm (doublet, fine resolution, 1H), 6.9 ppm (singlet, fine resolution, 1H), 6.7 ppm (doublet, 1H), 3.8 ppm (multiplet, 4H), 3.7 (multiplet, 2H), 2.5 ppm (singlet, 4H), 1.75 ppm (singlet, 2H), 1.5-0.5 ppm (singlets, 325H)

IIf.

350 g of polyisobutenylphenol from Example 1b and 16 g of dimethylamine (40 ml of 40% strength aqueous solution) in 200 ml of toluene were initially taken in a 1 l four-necked flask with a water separator. 29 ml of 37% strength aqueous solution of formaldehyde were added dropwise at 20-30° C. and refluxing was carried out. Water was then removed in the course of 3 hours. The solution was filtered and the solvent was removed under reduced pressure: 355 g of oil.

$^1$H-NMR: 7.1 ppm (doublet, fine resolution, 1H), 6.9 ppm (singlet, fine resolution, 1H), 6.7 ppm (doublet, 1H), 3.65 ppm (singlet, 2H), 2.1 ppm (singlet, 6H), 1.75 ppm (singlet, 2H), 1.5-0.5 ppm (singlets, 138H)

IIg.

A 1 l four-necked flask was charged with 151.7 g of tert-butylamine. After cooling to 20.4° C. in an ice bath, 177.7 g of 37% formaldehyde solution were added dropwise at a temperature in the range from 20.5 to 24.9° C. over 30 minutes. 50 g of KOH pastilles were then added, and the resulting oil layer was separated off. The oil was treated once more with 50 g of KOH pastilles, separated off and filtered to obtain 145 g of a light-colored oil (N-tert-butylmethyleneimine which, according to $^1$H-NMR, included 20% of N,N',N''-tri-tert-butylhexahydro-1,3,5-triazine).

$^1$H-NMR of tert-butylmethyleneimine: 7.25 ppm (quartet, 2H), 1.2 ppm (singlet, 9H), $^1$H-NMR of N,N',N''-tri-tert-butylhexahydro-1,3,5-triazine: 3.5 ppm (singlet, 6H), 1.15 ppm (singlet, 27H)

A 250 ml four-necked flask was charged with 108 g of PIB-phenol from Example 1b, and 9.5 g of tert-butylmethyleneimine were added dropwise at 25° C. Stirring at 40° C. for 3 hours was followed by taking up with 100 ml of hexane and washing 3 times with methanol. The solvent was stripped off at 100° C. and 20 mbar: 90 g of oil.

$^1$H-NMR: 7.1 ppm (doublet, fine splitting, 1H), 6.9 ppm (singlet, fine splitting, 1H), 6.7 ppm (doublet, 1H), 3.95 ppm (singlet, 2H), 1.75 ppm (singlet, 2H), 1.2 ppm (singlet, 9H), 1.5-0.5 ppm (singlets, 138H).

IIh.

A 1 l four-necked flask was charged with 153 g of N,N-dimethylaminopropylamine. After cooling to 20.4° C. in an ice bath, 130 g of 37% formaldehyde solution were added dropwise at a temperature in the range from 20 to 25° C. over 30 minutes. 50 g of KOH pastilles were then added, and the resulting oil layer was separated off. The oil was treated once more with 50 g of KOH pastilles, separated off and filtered to obtain 145 g of a light-colored oil (N,N',N''-tris(N,N-dimethylaminopropyl)-hexahydro-1,3,5-triazine).

$^1$H-NMR of N,N',N''-tris(N,N-dimethylaminopropyl) hexahydro-1,3,5-triazine: 3.3 ppm (singlet, 6H), 2.4 ppm (triplet, 6H), 2.25 ppm (triplet, 6H), 2.2 ppm (singlet, 18H), 1.6 ppm (multiplet, 6H).

A 250 ml four-necked flask was charged with 110 g of PIB-phenol from Example 1b, and 11.5 g of N,N',N''-tris(dimethylamino-propyl)hexahydro-1,3,5-triazine were added dropwise at 25° C. Stirring at 80° C. for 3 hours was followed by taking up with 100 ml of hexane, washing 3 times with water and drying with Na$_2$SO$_4$. The solvent was stripped off at 100° C. and 20 mbar: 95 g of oil.

$^1$H-NMR: 7.1 ppm (doublet, fine splitting, 1H), 6.9 ppm (singlet, fine splitting, 1H), 6.7 ppm (doublet, 1H), 3.9 ppm (singlet, 2H), 2.4 ppm (triplet, 2H), 2.25 ppm (triplet, 2H), 2.2 ppm (singlet, 6H), 1.75 ppm (singlet, 2H), 1.2 ppm (singlet, 9H), 1.6 ppm (multiplet, 2H), 1.5-0.5 ppm (singlets, 138H).

The Mannich adducts of the following Table 1 were prepared similarly to the preparative method of Example 11a.

TABLE 1

| Example No. | $M_n$ Polyisobutenyl radical | Amine | PIB-phenol [11] [mol] | Amine [mol] | Formaldehyde [mol] | Yield [g] | δ of amino-methylene protons [ppm] |
|---|---|---|---|---|---|---|---|
| 1 | 2300 | DMAPA [3] | 0.05 | 0.055 | 0.055 | 115 | 3.9 |
| 2 | 2300 | NMPIP [4] | 0.05 | 0.11 | 0.11 | 109 | 3.7 |
| 3 | 2300 | Morpholine | 0.05 | 0.055 | 0.055 | 106 | 3.7 |
| 4 [1] | 550 | DEOHA [5] | 0.167 | 0.33 | 0.35 | 136 | 3.7 |
| 5 | 750 | DMAPA | 0.27 | 0.29 | 0.29 | 254 | 3.9 |
| 6 | 1300 | DMA [6] | 0.26 | 0.34 | 0.32 | 360 | 3.6 |
| 7 | 250 | DETA [7] | 0.43 | 1.03 | 0.95 | 260 | 3.9 + 3.75 |
| 8 | 550 | DMA | 0.39 | 0.5 | 0.47 | 266 | 3.6 |
| 9 | 700 | DMA | 0.44 | 0.57 | 0.53 | 369 | 3.6 |
| 10 | 1000 | DEA [8] | 0.1 | 0.12 | 0.12 | 112 | 3.72 + 3.64 |
| 11 | 1000 | DPA [9] | 0.1 | 0.12 | 0.12 | 113 | 3.77 |
| 12 [2] | 1000 | DMA | 0.1 | 0.13 | 0.13 | 116 | 3.55 |
| 13 [2] | 1000 | DEA | 0.084 | 0.11 | 0.11 | 89 | 3.68 |
| 14 [2] | 1000 | DPA | 0.073 | 0.1 | 0.1 | 84 | 3.7 |
| 15 | 1000 | TMPDA [10] | 0.1 | 0.15 | 0.13 | 119 | 3.67 |
| 16 [1] | 1000 | DEOHA | 0.1 | 0.12 | 0.11 | 115 | 3.8 |
| 17 [1] | 1000 | DEOHA | 0.1 | 0.24 | 0.3 | 118 | 3.75 |
| 18 | 700 | DEOHA | 0.43 | 0.47 | 0.47 | 366 | 3.6 |
| 19 [1] | 224 | DEOHA | 0.25 | 0.8 | 0.9 | 166 | 3.7 |
| 20 [1] | 224 | DEOHA | 0.25 | 0.27 | 0.3 | 106 | 3.75 |
| 21 [1] | 2300 | DEOHA | 0.025 | 0.027 | 0.03 | 64 | 3.75 |
| 22 [1] | 2300 | DEOHA | 0.025 | 0.08 | 0.09 | 69 | 3.7 |

[1] Paraformaldehyde was used instead of 37% formaldehyde solution
[2] 2-Methyl-4-polyisobutenylphenol was used instead of 37% formaldehyde solution
[3] 3-(Dimethylamino)-n-propylamine
[4] N-Methylpiperazine
[5] Diethanolamine
[6] Dimethylamine
[7] Diethylenetriamine
[8] Diethylamine
[9] Dipropylamine
[10] Trimethylpropylenediamine
[11] Polyisobutenylphenol III. Testing of the Performance Characteristics The lubricant used below was in each case reference oil RL 189/5.

IIIa.

The intake valve cleanliness was tested by CEC method F-05-A-93 in an Opel Kadett engine. Commercial European premium grade base fuel according to EN 228, to which either no fuel additive (comparative example 1) or fuel additives not according to the invention and based on Mannich adducts (comparative example 2) or a novel polyisobutenylphenol-containing Mannich adduct (Example 1) had been added, was used for this purpose.

The fuel additive not according to the invention and from comparative example 2 was prepared according to comparative example 2 of EP-A-0 831 141.

The novel polyisobutenylphenol-containing Mannich adduct from Example B1 was prepared according to Ia and IIc.

The novel polyisobutenylphenol-containing Mannich adduct of Example B2 was prepared according to Ib and IIf.

The most important parameters, the dosage and the performance results, are summarized in Table 2.

TABLE 2

|  | $M_N{}^{1)}$ | Amine | Dosage [mg/kg] | Valve deposits [mg/valve] | | | | Mean value$^{2)}$ |
|---|---|---|---|---|---|---|---|---|
|  |  |  |  | 1 | 2 | 3 | 4 |  |
| Comp. 1 | — | — | — | 450 | 188 | 316 | 366 | 330 |
| Comp. 2 | 1000 | EDA$^{3)}$ | 400 | 9 | 127 | 7 | 193 | 84 |
| Inv. 1 | 550 | DMAPA$^{4)}$ | 400 | 0 | 1 | 0 | 0 | 0.25 |
| Inv. 2 | 1000 | DMA$^{5)}$ | 300 | 0 | 0 | 0 | 0 | 0 |

$^{1)}$Number average molecular weight of the polyisobutenyl radical
$^{2)}$Mean value of the deposits from the four valves
$^{3)}$Ethylenediamine
$^{4)}$3-(Dimethylamino)-n-propylamine
$^{5)}$Dimethylamine IIIb.

The intake valve cleanliness was tested by CEC method F-04-A-87 in an Opel Kadett engine using a commercial European premium grade base fuel according to EN 228 either without fuel additive (Comparative Example 3), or with a noninventive fuel additive based on a polyisobutenylamine obtainable by hydroformylation and subsequent reductive amination of a polyisobutene (Comparative Example 4) or with inventive polyisobutenylphenol-containing Mannich adducts (Inventive Examples 3 and 4). The additive was used in the form of a 50% by weight solution in a $C_{10}$-$C_{13}$ paraffin.

Some parameters of the additives used, the dosage and the performance results are summarized in Table 3.

TABLE 3

| Example No. | $M_n{}^{1)}$ | Amine | Dosage [mg/kg] | Δ IVD $^{2)}$ [mg/valve] |
|---|---|---|---|---|
| Comp. 3 | — | — | 300 | 442 |
| Comp. 4 | 1000 | NH$_3$ | 300 | 75 |
| Inv. 3 | 1000 | DMAPA $^{3)}$ | 300 | 3 |
| Inv. 4 | 1000 | DMA $^{4)}$ | 300 | 2 |

$^{1)}$ Number average molecular weight of polyisobutenyl radical
$^{2)}$ IVD = intake valve deposits; mean of deposits on all valves
$^{3)}$ 3-(Dimethylamino)-n-propylamine
$^{4)}$ Dimethylamine IIIc.

The intake valve cleanliness was tested by CEC method F-05-A-93 in a Mercedes Benz M 102 E engine using a commercial European premium grade base fuel according to EN 228 either without fuel additive (Comparative Example 5) or with a fuel additive mixture comprising 41% by weight of a synthetic carrier oil (based on a polybutoxylated fatty alcohol) and 59% by weight of a noninventive (Comparative Example 6) or an inventive polyisobutenylphenol-containing Mannich adduct (Inventive Example 5). The Mannich adducts were used in the form of a 50% by weight solution in a $C_{10}$-$C_{13}$-paraffin.

The noninventive fuel additive used was a polyisobutenylphenol-containing Mannich adduct based on a conventional polyisobutene, phenol and dimethylaminopropylamine.

The essential parameters, the dosage and the performance results are summarized in Table 4.

TABLE 4

| Example No. | $M_n{}^{1)}$ | Amine | Dosage [mg/kg] | Δ IVD $^{2)}$ [mg/valve] |
|---|---|---|---|---|
| Comp. 5 | — | — | 600 | 298 |
| Comp. 6 | 1000 | DMAPA $^{3)}$ | 600 | 194 |
| Inv. 5 | 1000 | DMAPA | 600 | 53 |

$^{1)}$ Number average molecular weight of polyisobutenyl radical
$^{2)}$ IVD = intake valve deposits; mean of deposits on all valves
$^{3)}$ 3-(Dimethylamino)-n-propylamine IIId.

The intake valve cleanliness was tested by CEC method F-05-A-93 in a Mercedes Benz M 102 E engine using a commercial European premium grade base fuel according to EN 228 either without fuel additive (Comparative Example 7) or with a fuel additive mixture comprising 40% by weight of a synthetic carrier oil (based on a polybutoxylated fatty alcohol) and 60% by weight of a noninventive (Comparative Example 8) or an inventive polyisobutenylphenol-containing Mannich adduct (Inventive Examples 6 to 12). The Mannich adducts were used in the form of a 50% by weight solution in a $C_{10}$-$C_{13}$-paraffin.

The noninventive fuel additive used was a polyisobutenylamine obtainable by hydroformylation and subsequent reductive amination of a polyisobutene.

The essential parameters, the dosage and the performance results are summarized in Table 5.

TABLE 5

| Example No. | $M_n$ [1] | Reactant content [wt %] | Bis(amino-methyl) derivate content [wt %] | Amine | Dosage [mg/kg] | Δ IVD [2] [mg/valve] |
|---|---|---|---|---|---|---|
| Comp. 7 | — | — | — | — | 400 | 277 |
| Comp. 8 | 1000 | — | — | NH$_3$ | 400 | 27 |
| Inv. 6 | 1000 | 4 | 2 | DMA [3] | 400 | 8 |
| Inv. 7 | 1000 | 1 | 3 | DMA | 400 | 13 |
| Inv. 8 | 1000 | 9 | 0 | DMA | 400 | 1 |
| Inv. 9 | 1000 | 0 | 24 | DMA | 400 | 16 |
| Inv. 10 | 1000 | — | — | DPA [4] | 400 | 9 |
| Inv. 11 | 1000 | — | — | DEA [5] | 400 | 10 |
| Inv. 12 [6] | 1000 | — | — | DMA | 400 | 14 |

[1] Number average molecular weight of polyisobutenyl radical
[2] IVD = intake valve deposits; mean of deposits on all valves
[3] Dimethylamine
[4] Dipropylamine
[5] Diethylamine
[6] Cresol was used instead of phenol in the aminoalkylation IIIe.

The intake valve cleanliness was tested by CEC method F-05-A-93 in a Mercedes Benz M 102 E engine using a commercial European premium grade base fuel according to EN 228 either without fuel additive (Comparative Example 9) or with a fuel additive mixture comprising 40% by weight of a synthetic carrier oil (based on a propoxylated fatty alcohol) and 60% by weight of a noninventive fuel additive (Comparative Example 10) or an inventive polyisobutenylphenol-containing Mannich adduct (Inventive Example 13). The fuel additives were used in the form of a 50% by weight solution in a $C_{10}$-$C_{13}$-paraffin.

The noninventive fuel additive used was a polyisobutenylamine obtainable by hydroformylation and subsequent reductive amination of a polyisobutene.

The essential parameters, the dosage and the performance results are summarized in Table 6.

TABLE 6

| Example No. | $M_n$ [1] | Amine | Dosage [mg/kg] | Δ IVD [2] [mg/valve] |
|---|---|---|---|---|
| Comp. 9 | — | — | 325 | 304 |
| Comp. 10 | 1000 | NH$_3$ | 325 | 5 |
| Inv. 13 | 1000 | DMA [3] | 325 | 3 |

[1] Number average molecular weight of polyisobutenyl radical
[2] IVD = intake valve deposits; mean of deposits on all valves
[3] Dimethylamine

We claim:

1. A Mannich adduct obtained by
   a) alkylating a phenol with polyisobutene to form an alkylation product, wherein the polyisobutylene has more than 70 mol % of vinylidene double bonds and a number average molecular weight of from 300 to 3000 at below about 50° C. in the presence of an alkylation catalyst;
   b) reacting the alkylation product with at least one of formaldehyde, an oligomer of formaldehyde and a polymer of formaldehyde, and at least one amine having at least one secondary amino function and no primary amino function.

2. A detergent additive comprising the Mannich adduct claimed in claim 1.
3. A lubricant composition comprising the Mannich adduct claimed in claim 1.
4. An additive concentrate comprising:
   one or more additive components, and
   at least one Mannich adduct claimed in claim 1,
   wherein the Mannich adduct is present in the additive concentrate in an amount of from 0.1 to 99% by weight.
5. An additive concentrate, comprising:
   one or more additive components, and
   at least one Mannich adduct as claimed in claim 1,
   wherein the Mannich adduct is present in the additive concentrate in an amount of from 0.5 to 80% by weight.
6. A fuel composition, comprising:
   a main amount of a liquid hydrocarbon fuel, and
   at least one Mannich adduct as claimed in claim 1,
   wherein the Mannich adduct is present in the additive concentrate in a detergent activity effective amount.
7. A lubricant composition, comprising:
   a main amount of a liquid, semisolid or solid lubricant, and
   at least one Mannich adduct as claimed in claim 1,
   wherein the Mannich adduct is present in the additive concentrate in a detergent activity effective amount.
8. The Mannich adduct claimed in claim 1, wherein the alkylation product is reacted in step b) with an amine of formula HNR$^4$R$^5$ wherein R$^4$ and R$^5$ are $C_1$-$C_{20}$ alkyl radicals.
9. The Mannich adduct claimed in claim 8, wherein R$^4$ and R$^5$ are selected from the group consisting of methyl, ethyl, n-propyl, sec-propyl, isopropyl, n-butyl, isobutyl, sec-butyl, tert-butyl, n-pentyl and n-hexyl.
10. A Mannich adduct obtained by
    a) alkylating a phenol with polyisobutene to form an alkylation product, wherein the polyisobutylene has more than 70 mol % of vinylidene double bonds and a number average molecular weight of from 300 to 3000 at below about 50° C. in the presence of an alkylation catalyst;
    b) reacting the alkylation product with at least one of formaldehyde, an oligomer of formaldehyde and a polymer of formaldehyde, and at least one amine having at least one secondary amino function and no primary amino function;
    wherein the amine has at least two secondary amino functions.
11. A Mannich adduct obtained by
    a) alkylating a phenol with polyisobutene to form an alkylation product, wherein the polyisobutylene has more than 70 mol % of vinylidene double bonds and a number average molecular weight of from 300 to 3000 at below about 50° C. in the presence of an alkylation catalyst;
    b) reacting the alkylation product with at least one of formaldehyde, an oligomer of formaldehyde and a polymer of formaldehyde, and at least one amine having at least one secondary amino function and no primary amino function;
    wherein the amine has at least one secondary amino function and at least one tertiary amino function.
12. The Mannich adduct as claimed in claim 1, wherein the amine is di[3-(dimethylamine)-N-propyl]amine.

* * * * *